United States Patent

Hansen et al.

[11] Patent Number: 5,888,562
[45] Date of Patent: Mar. 30, 1999

[54] ENZYMATIC TREATMENT OF COCOA

[75] Inventors: Carl Erik Hansen, Epalinges, Switzerland; Anthony Klueppel, Dublin, Ohio; Eric Raetz, Lausanne, Switzerland

[73] Assignee: Nestec S.A., Vevey, Switzerland

[21] Appl. No.: 660,901

[22] Filed: Jun. 10, 1996

[30] Foreign Application Priority Data

Jun. 20, 1995 [EP] European Pat. Off. ............. 95201668

[51] Int. Cl.$^6$ ...................................... A23G 1/00
[52] U.S. Cl. ............................... 426/45; 426/44; 426/52; 426/631
[58] Field of Search ................... 426/45, 44, 49, 426/52, 593, 658, 660, 631, 533, 534, 650

[56] References Cited

U.S. PATENT DOCUMENTS

| | | | |
|---|---|---|---|
| 800,448 | 9/1905 | Kerr | 426/45 |
| 1,854,353 | 4/1932 | Wallertstein | 426/45 |
| 2,965,490 | 12/1960 | Rusoff | 426/45 |
| 3,970,520 | 7/1976 | Feldman et al. | |

FOREIGN PATENT DOCUMENTS

| | | |
|---|---|---|
| 0298419 | 1/1989 | European Pat. Off. . |
| 0420979 | 4/1991 | European Pat. Off. . |
| 0461261 | 12/1991 | European Pat. Off. . |
| 2406665 | 5/1979 | France . |
| 679629 | 3/1992 | Switzerland . |

OTHER PUBLICATIONS

Shimazki et al. JP 07–79749 Patent Abstracts of Japan, Mar. 1995, abstract only.

Patent Abstract of Japan, vol. 006, No. 102 (C–107), 11 Jun. 1982 & JP–A–57 033547 (Fuji Oil Co) 23 Feb. 1982.

*Primary Examiner*—Leslie Wong
*Attorney, Agent, or Firm*—Pennie & Edmonds LLP

[57] ABSTRACT

Process for treating a cocoa nib or liquor, in which a nib or a liquor is prepared from cocoa beans fermented for 1 to 15 days, it is mixed with at least one technical protease in an aqueous medium at pH 3–8, and the mixture is incubated for a time and at a temperature sufficient to obtain at least 10 $\mu$mol of hydrophobic amino acids per gram of dry matter and at least 1.4 times more hydrolysis products, compared with those initially present in the cocoa beans. Composition comprising a nib or a liquor from cocoa beans fermented for about 1 to 15 days, and a technical protease and/or a technical invertase. Cocoa obtained by roasting the composition according to the invention.

15 Claims, 1 Drawing Sheet

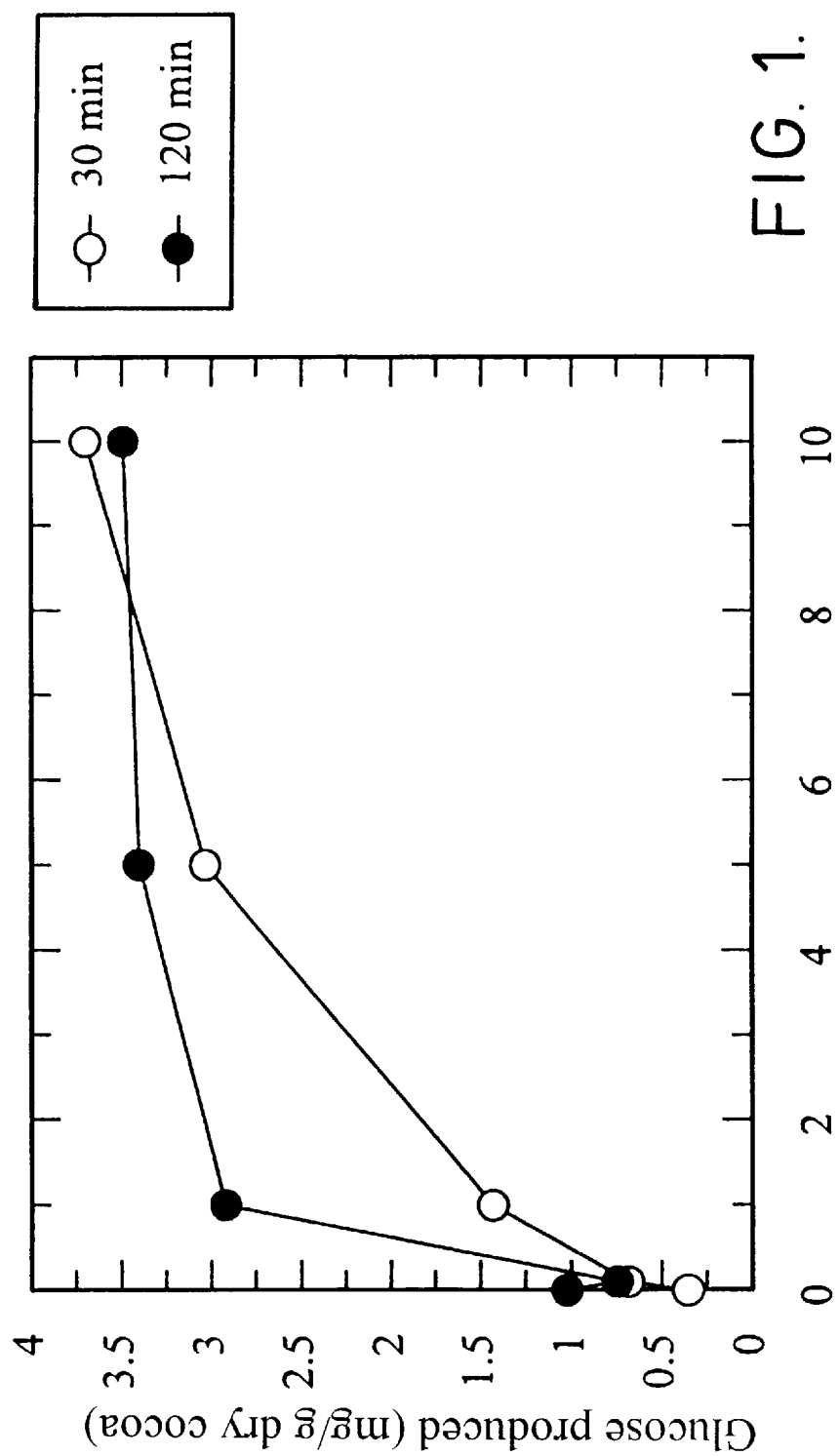

ENZYMATIC TREATMENT OF COCOA

TECHNICAL FIELD

The invention relates to a process for the enzymatic treatment of a cocoa nib or liquor for improving its flavor precursor composition, and which makes it possible to use a wide range of cocoa beans in various fermentation states.

BACKGROUND

The quality of a chocolate is directly influenced by the geographic and genetic origin, and the conditions for treating the cocoa beans, from their cultivation in the field up to their processing in the factory. Once harvested, cocoa beans are thus subjected, in their country of origin, to a fermentation and a natural drying which are intended to cause the appearance of the flavor precursors. Unfortunately, the harvesting at maturity of the beans and the conditions for their fermentation are not always adequately controlled. Furthermore, the three principal types of cocoa trees of the species *Theobroma cacao*, called Criollo, Forastero and Trinitario, each produce beans having a different composition. Finally, the dried beans can also be damaged during their transport to the countries specialized in the processing of the beans. Industry must therefore address a wide variability in the composition of a batch of cocoa beans (see for example Smaffer M., The Manufacturing Confectioner, 92–94, June 1994).

The fermented and dried cocoa beans are then traditionally crushed to a greater or lesser extent, the outer coats are separated, and then they are subjected to roasting, combined where appropriate with alkalization, which are intended to cause the cocoa flavor and colour to appear. The roasting step involves Maillard reactions between the reducing sugars and the products of the degradation of proteins, especially the amino acids and the hydrolysis products (Wood and Lass, Cocoa, Longman Scientific & Technical, Longman Group UK, England, 1985, ISBN 0-582-46352-1).

The flavor precursors appear only during the natural fermentation of the beans, as a result of hydrolysis reactions. Experiments involving in vitro incubation of unfermented cocoa beans or bean fragments have thus shown that these hydrolysis reactions are dependent on the pH, the temperature and the compartmentation of the enzymes and of the substrates in the bean. Furthermore, the hydrolysis reactions are also sensitive to the presence of polyphenols. It is thus advantageous to extract the polyphenols from the beans using acetone, and also to incubate the said beans in acetic acid in order to decompartmentalize the enzymes and the substrates (Biehl B. et al., J. Sci. Food. Agric., 33, 1280–1290, 1982).

Furthermore, other studies have shown that cocoa beans comprise at least three protolytic activities involved in the appearance of the cocoa flavor precursors, namely an endoprotease having an optimum activity at pH 3.5, a carboxypeptidase having an optimum activity at pH 5.8, and an aminopeptidase having an optimum activity at pH 7. Experiments involving hydrolysis of purified cocoa bean globulin (protein having two bands of 31 kD and 47 kD on an SDS-PAGE chromatography gel), from which the polyphenols have been extracted, with commercial proteases and/or purified cocoa endoprotease and carboxypeptidase have shown that it was preferable to hydrolyse the globulin successively with cocoa endoprotease at pH 3.5, then with cocoa carboxypeptidase or a commercial carboxypeptidase at pH 5–6. In this way, a hydrolysis product and amino acid composition is obtained which is suitable for obtaining a cocoa flavor during subsequent roasting of the mixture in the presence of reducing sugars (Voigt J. et al., Food Chemistry, 50, 177–184, 1994).

Moreover, U.S. Pat. No. 2,965,490 describes a process for the in vitro hydrolysis of unfermented cocoa beans (green cocoa beans), intended to replace the natural fermentation of the beans. To this end, the green cocoa bean proteins are hydrolysed with acid or enzymatically, the carbohydrates in the said beans are hydrolysed enzymatically to produce simple sugars, and both hydrolysates are allowed to react under anhydrous conditions at a temperature and for a time sufficient to produce an aromatic factor. However, it should be stated that the polyphenols in the green seeds limit particularly the enzymatic hydrolysis of the storage proteins (see Comparative Example 1 below).

In the final analysis, the processes and studies described above are evidently intended to replace the natural fermentation of the cocoa beans with a controlled enzymatic hydrolysis of the green beans (problem caused by the polyphenols) or of their purified proteins (from which the polyphenols have been extracted). Furthermore, the quality and the quantity of flavor precursors necessary for the creation of a good cocoa flavor during roasting are not yet known.

SUMMARY OF THE INVENTION

The aim of the present invention is to overcome the variability in the flavor precursor composition of fermented cocoa beans, and to confer an optimum flavor precursor composition on a cocoa bean nib or liquor.

To this end, in the process according to the present invention, a nib or a liquor is prepared from cocoa beans fermented for 1 to 15 days, it is mixed with at least one protease in an aqueous medium at pH of 3–8, and the mixture is incubated for a time and at a temperature sufficient to hydrolyse the proteins and the peptides.

Preferably, the mixture is incubated for a time and at a temperature sufficient to obtain at least 10 $\mu$mol of hydrophobic amino acids per gram of dry matter and/or at least 1.4 times more hydrolysis products, compared with those initially present in the cocoa beans.

The present process makes it possible to enhance the hydrolysis of the storage proteins in the cocoa beans, which initially takes place during the natural fermentation of the beans, until sufficient quantities and a correct amino acid and hydrolysis product composition are obtained.

The subsequent roasting of the mixture according to the invention then makes it possible to obtain a good cocoa flavor, which may even be stronger and more concentrated, compared with that obtained after roasting of traditionally fermented cocoa beans.

It is also possible to use cocoa beans taken at various stages of fermentation, such as for example underfermented beans not containing enough flavor precursors, overfermented beans not containing the correct flavor precursor composition, or poorly fermented beans such as acidic beans containing a poor flavor precursor composition. Likewise, the cocoa beans may be of different plant and geographic origins. The present process thus makes it possible to homogenize the flavor precursor composition of a mixture of beans of different origins and stages of fermentation.

Furthermore, the hydrolysis of a cocoa nib or liquor by technical enzymes is surprising because of their sensitivity to the polyphenols in the beans. It has been possible to show that beans fermented naturally for at least 1 day have a sufficiently low polyphenol level for the technical enzymes not to be significantly inhibited in the present process. On the other hand, green cocoa beans have a polyphenol level which is too high for them to be used in the present process.

In particular, the addition of an invertase makes it possible to advantageously increase the natural glucose and fructose content of the mixture, which promotes the formation of flavor during subsequent roasting of the mixture.

Finally, the possible use of various technical enzymes in the present invention opens the possibility of creating variants of cocoa flavor which can be appreciated by the consumer.

BRIEF DESCRIPTION OF THE DRAWINGS

FIG. 1 is a graphical representation of the quantity of glucose produced by an invertase in a mixture of water and nib of insufficiently fermented cocoa beans, according to the treatment time and as a function of the quantity of invertase added.

DETAILED DESCRIPTION OF THE INVENTION

One enzymatic activity unit is defined in the rest of the description as $\mu$mol of product converted per minute. Likewise, the percentages are given by weight unless otherwise indicated.

The expression "underfermented or insufficiently fermented cocoa beans" designates beans traditionally fermented for about 1 to 4 days and then dried, in which the proteins exhibit, in SDS-PAGE chromatography on a polyacrylamide gel, 2 visible bands corresponding to the 21 kD and 31 kD/47 kD storage proteins (see WO91/00913 and WO91/00914). Moreover, the beans do not have a sufficient quantity of amino acids and peptides to form a cocoa flavor during subsequent roasting.

The expression "well fermented cocoa beans" designates beans fermented and dried traditionally for about 2 to 10 days, and in which the proteins exhibit, in SDS-PAGE chromatography on a polyacrylamide gel, a visible band corresponding to the 21 kD storage protein, the two bands corresponding to the 21 kD/47 kD protein being partially or completely degraded. Moreover, these beans have a sufficient quantity of amino acids and peptides to form a cocoa flavor during subsequent roasting.

The expression "overfermented cocoa bean" designates beans fermented and dried traditionally for about 7 to 15 days, in which the proteins do not exhibit, in SDS-PAGE chromatography on a polyacrylamide gel, visible and distinct bands corresponding to the 21 kD and 31 kD/47 kD storage proteins. Moreover, these beans have a sufficient quantity of amino acids, but an insufficient quantity of peptide to form a cocoa flavor during subsequent roasting.

Finally, for the purposes of the present invention, a nib is obtained by conventional crushing of fermented or unfermented cocoa beans, and a cocoa liquor is obtained by grinding the beans or the nib to a greater or lesser extent until the cocoa butter is released from the cells.

To carry out the present process, a nib or a liquor is prepared from cocoa beans fermented for 1 to 15 days. It is therefore possible to use, mixed or otherwise, cocoa beans taken at various stages of fermentation, such as underfermented, well fermented, overfermented or poorly fermented beans. It is also possible to use, mixed or otherwise, cocoa beans obtained from various genotypes of cocoa trees, *Theobroma cacao* Criollo, Forastero and/or Trinitario. The nib or the liquor can be reduced to a fine powder; however, it should be noted that if the nib or liquor is treated enzymatically at a temperature higher than 35°–45° C., the liquor or nib pieces will melt, thus making it possible for the enzymes to reach the innermost material in the mixture.

The nib or the liquor is then mixed with at least one protease in an aqueous medium at pH 3–8. The protease may be chosen alone or in combination, from the group consisting of endoproteases, carboxypeptidases and aminopeptidases. The pH of the aqueous medium may be adjusted by adding an inorganic or organic acid, or a buffer chosen from those commonly used in industrial food processing, especially buffers based on citrate, phosphate or acetate. In particular, a pH of 3–5 may be preferred so as to also activate the endogenous endoproteases in the bean; however, it is preferable to choose, consequently, a technical protease which is active in this acidity range.

The mixture may comprise about 10–80% of a cocoa nib or liquor, especially 20–70%, and 1–100 units of protease per gram of mixture, especially 0.01–5% (weight/weight) of a commercial technical protease preparation.

To carry out the present process, the mixture is then incubated for a time and at a temperature sufficient to hydrolyse the proteins and peptides in the mixture.

Preferably, the mixture is incubated for a time and at a temperature sufficient to obtain at least 10 $\mu$mole of hydrophobic amino acids per g of dry matter and/or at least 1.4 times more, even 1.7 or even 2 times more hydrolysis products, compared with those initially present in the treated cocoa beans. In this context, the quantity of the same hydrolysis products (peptides and amino acids) which is found in the nibs obtained before and after treatment according to the invention can be compared. It is also possible to take into account the appearance of new hydrolysis products, relative to those present in the untreated nib according to the invention, while being confined, however, to those which appear significantly during the natural fermentation of green cocoa beans, for example. In particular, the quantity of four hydrolysis products having a retention time of about 9, 17, 24 and 29.5 min is compared during a chromatography on a C18 reversed-phase HPLC column (No. 218TP54 Vydac; U.S.A.) characterized by a constant flow rate of 1 ml/min and eluents consisting of an aqueous solution comprising 0.1% trifluoroacetic acid and 2% acetonitrile for 10 min, followed by a linear gradient comprising 0.1% trifluoroacetic acid and 2% to 52.7% acetonitrile for 50 min. The eluted hydrolysis products are detected at 215 and 280 nm.

Likewise, it is possible to take into account, as hydrophobic amino acids, only those predominantly present in the nib treated according to the invention, in particular phenylalanine, leucine and alanine.

To obtain a sufficient quantity of hydrophobic amino acids and of hydrolysis products, the mixture can be incubated at 10°–60° C. for 30 min to 20 h, for example. However, the hydrolysis time and temperature will need to be chosen as a function of the medium, the type of enzyme, the level of fermentation of the beans and the origin of the beans.

In a first specific embodiment of the present invention, a nib or liquor is prepared from cocoa beans fermented for 1 to 15 days, it is mixed with an aqueous medium at pH 3–6, the mixture is incubated at 40°–60° C. for 10 min to 20 h so as to promote the action of the cocoa endoprotease, the pH of the medium is adjusted to pH 4–8, at least one technical protease is added to it, and it is incubated at 10°–60° C. for 5 min to 20 h, so as to obtain hydrolysis of the proteins and of the peptides, but preferably at least 10 μmol of hydrophobic amino acids per gram of dry matter and/or at least 1.4 times more hydrolysis products (peptides and amino acids), compared with those initially present in the cocoa beans.

In a second specific embodiment of the present invention, a nib or liquor is prepared from cocoa beans fermented for 1 to 15 days, it is mixed with an aqueous medium at pH 4–8, at least one protease is added to it, and it is incubated at 10°–60° C. for 5 min to 20 h, so as to obtain hydrolysis of the proteins and the peptides, but preferably at least 10 μmol of hydrophobic amino acids per gram of dry matter and/or at least 1.4 times more hydrolysis products (peptides and amino acids), compared with those initially present in the cocoa beans. Preferably, a pH range is chosen in which the cocoa endoprotease as well as the technical protease remain active.

Finally, in a third specific embodiment of the present invention, at least one enzyme chosen from the group consisting of invertases, glycosidases, cellulases, pectinases and oxydases may be added to the reaction mixture. Preferably, at least one of the said enzymes is added in an amount of 0.01 to 5% of a commercial enzyme preparation, or 1–100 units/g of mixture. The reaction mixture should be understood to be one of the mixtures described above, which is incubated for a certain period (comprising the technical protease or otherwise).

In particular, the technical protease and/or cocoa endoprotease treatment is combined with a technical invertase. This treatment makes it possible advantageously to produce hydrophobic amino acids and other hydrolysis products which will combine with glucose and fructose, during subsequent roasting, to give a more chocolatelike flavor (which evokes a rich taste). Unexpectedly, the cocoa endoprotease, the technical invertase and protease can be used in a single step (second embodiment of the invention), by choosing, however, a pH range which is favorable to the activity to all the enzymes (the endoprotease, the technical protease and the invertase).

If invertase is not used, it may also be advantageous to add at least 0.1% of a reducing sugar to the final mixture before roasting, such as for example glucose and/or fructose in an amount of 0.1 to 5%.

Finally, after having carried out the present process, the mixture can be preserved by inactivating the enzymes using heat (80°–120° C. for 1 to 60 min) or a treatment at high hydrostatic pressure (greater than 500,000 kPa, for example. It is also possible to dry the mixture by freeze-drying, by spray-drying, by vacuum suction, or by evaporation of the water during gentle heating of the mixture. Preferably, the mixture is dried until a moisture content of the mixture of less than 10%, especially 5%, is reached. The mixture may also be subjected to conventional roasting and/or alkalization, like that described in EP 0,226,727.

Preferably, after having carried out the present process, the pH of the mixture is adjusted to 5–6, it is dried and it is roasted.

The invention also relates to the compounds comprising a nib or liquor from cocoa beans fermented for 1 to 15 days, and a technical protease and/or a technical invertase. If the enzymes are still active, the compositions may contain at least 1 enzymatic activity unit per gram of composition. In the case where these enzymes are inactive, for example following a heat denaturation treatment, they can, nevertheless, still be identified with the aid of appropriate antibodies, indicating the previous use of this enzyme.

These compositions may therefore comprise a cocoa nib or liquor prepared from a mixture of beans in various states of fermentation and/or obtained from various genotypes of cocoa trees. These compositions may be one of the compositions presented above within the framework of the present process. The invention therefore also covers the dried compositions, comprising the addition of glucose and/or fructose, and in particular the cocoas (powder, nib, liquor and the like) obtained by roasting the said compositions. These compositions differ in particular from the prior art because they are derived from a mixture comprising beans taken in various states of fermentation and/or obtained from various genotypes of cocoa trees, and active or inactive technical proteases and/or invertases.

The present invention is described in greater detail below with the aid of the examples which follow. These examples are preceded by a description of various tests, and a brief presentation of the figure. It goes without saying, however, that these examples are given by way of illustration of the subject of the invention and do not constitute in any manner a limitation thereof.

Amino acid analysis

The inactivated mixture according to the invention is subjected to an ultrasonic bath for 10 min, it is homogenized for twice 1 min at 9600 rpm (Polytron), it is centrifuged for 10 min at 10,000 g, the supernatant is harvested, it is filtered and then its amino acid content is analysed by means of the ACCQTag® kit (Waters, U.S.A.).

For that, 20 μl of sample and standard are mixed with 140 μl of a borate buffer, 40 μl of a reagent comprising 6-aminoquinolyl-N-hydroxysuccinimidyl carbamate (AQC) are added, the mixture is vortexed and it is allowed to stand at room temperature for 1 min, it is heated at 55° C. for 7 min, it is injected into a C18 reversed-phase HPLC column (Nova-Pak C18, 4 μm; U.S.A.), and the amino acids derived at 36.5° C. are eluted at a flow rate of 1 ml/min, in a gradient: 100% of solvent A for 10 min, 98% of solvent A for 10.5 min, 93% of solvent A for 26 min, 90% of solvent A for 30 min, 67% of solvent A for 43 min, 30% of solvent A for 53 min, 100% of water for 54 min and 100% of an acetonitrile/water solvent (65%/35%) for 60 min (solvent A=phosphate buffer supplied by Waters).

The derived and eluted amino acids are detected at 395 nm by an Applied Biosystem model 980 detector. The amino acids of the mixture are then quantified in μmol per gram of dry mixture, in comparison with the standard samples derived and eluted under the same conditions.

Analysis of the hydrolysis products

Methanol is added to the inactivated mixture according to the invention up to a concentration of 70%, 1.5 ml of 70% methanol and 100 mg of polyvinylpyrrolidone (PVPP) are added, the mixture is kept under gentle stirring for 1 h at room temperature, it is centrifuged twice for 10 min at 20,000 g, the supernatant is harvested, the methanol is removed by vacuum suction, 0.35 ml of water is added to the pellet, the solution is centrifuged for 5 min at 20,000 g, it is filtered and then its hydrolysis product content is analysed by elution on a C18 reversed-phase HPLC column (No. 218TP54 Vydac; U.S.A.) at a flow rate of 1 ml/min in 0.1% trifluoroacetic acid and 2% acetonitrile in water for 10 min, followed by a linear gradient comprising 0.1% trifluoroacetic acid and 2 to 52.7% acetonitrile for 50 min. The hydrolysis products eluted are detected at 215 and 280 nm.

Within the framework of the present invention, the increase in the quantity of hydrolysis products (peptides and amino acids) in the mixture treated according to the invention, relative to those present in the untreated mixture, is determined by comparing the areas of the elution peaks of four hydrolysis products having a retention time of 9, 17, 24 and 29.5 min. These areas are generally found during the traditional fermentation of cocoa beans from the cocoa trees *Theobroma cacao* Trinitario, Criollo and Forastero. It cannot be excluded, however, that other hydrolysis products may also appear during the traditional fermentation of cocoa beans obtained from some specific genotypes of cocoa trees.

Analysis of the sugars

The inactivated mixture according to the invention is incubated for 30 min at 60° C., with stirring, it is allowed to stand at room temperature for 15–30 min, it is centrifuged twice at 20,000 g for 5 min, the supernatant is filtered on a C18 Waters Sep-Pak cartridge, the filtrate is again filtered on a Sartorius Minisart filter (SRP15, No. 1755K), and its glucose content determined by the "God-Perid" spectrophoto-metric method with the aid of a Boehringer-Mannheim No. 124028 kit (Germany), or alternatively by HPLC.

Sensory analysis

The hydrolysed liquor or nib according to the invention is heat-inactivated, the pH is adjusted to 5–6, it is dried by evaporation of the water under vacuum during gentle heating (<60° C.) until the moisture content is less than 10%, and then it is roasted in an oven at 130° C. for 15 min. The flavors generated by the roasting are then evaluated by a panel of individuals used to evaluating such flavors.

All the flavors are compared with those produced by cocoa bean nibs or liquors, simply dried and roasted under the same conditions, which are derived from insufficiently fermented Sanchez and Sulawesi cocoa beans, and well fermented Ghana cocoa beans (beans known to persons skilled in the art).

Each sample is evaluated for the following sensations "cocoa flavor" (derived from Ghana beans), "acidity" (qualifies the basic taste generated by dilute aqueous solutions of most acids), "bitterness" (qualifies the basic taste generated by dilute solutions of various substances such as quinine, perceived on the top of the tongue and at the back of the palate), "astringency" (the term has been broadened to the entire actions of polyphenols which result in sensations of a physical nature, from the suppression of unctuousness to the astringency in the medical sense which covers constriction and/or crispation of the tissues), "fruity" (taste note belonging to the bouquet and which evokes a fruit which has reached maturity: apple, banana, pear and the like), "flowery" (corresponds to an olfactory sensation evoking flowers in general: rose, jasmin, hyacinth, lilac and the like), "smoky" (taste and odour of smoked ham; defect resulting in general from drying the cocoa beans after fermentation by means of a wood fire), "musty", and "raw" (feature of insufficiently roasted cocoas where the flavor has not developed; linked to astringency and acidity; evokes raw groundnuts).

Comparative Example 1

A green cocoa bean nib from *Theobroma cacao* Trinitario ICS-95 is prepared conventionally, 100 mg of the said nib and, where appropriate, 100 mg of PVPP, which forms a complex with the polyphenols, are mixed with 1 ml of a 200 mM citrate buffer pH 4. The mixture is incubated for 2 h at 50° C., its pH is adjusted with 1 ml of a 200 mM citrate buffer pH 7, where appropriate 40 μl of phenoxypeptidase A (0.06 units/μl, Sigma), are added to it, it is incubated at 25° C. for 1 h, and then the reaction is stopped by heating the mixture at 95° C. for 5 min.

The degree of hydrolysis of the cocoa proteins is then analysed by determining, by means of the methods described above, the free amino acid content in the treated nibs and the areas of the elution peaks of four hydrolysis products in the initial nib and the treated nibs (products associated with the natural fermentation of the beans: amino acids and peptides).

The results presented in Table 1 below show that autolysis of the nib at pH 4 and at pH 7 does not make it possible to obtain a significant increase in the flavor precursors, compared with those initially present in the green cocoa beans. On the other hand, autolysis, at pH 4, of the nib comprising PVPP, followed by an enzymatic hydrolysis of the proteins at pH 7 makes it possible to obtain a significant increase in the flavor precursors. The polyphenols in the green cocoa beans therefore have a substantial inhibitory effect.

TABLE 1

| Enzymatic treatment | Addition of PVPP | Amino acids (μmol/g dry weight) Total | Amino acids (μmol/g dry weight) Hydrophobic | Areas for the hydrolysis products (arbitrary units) Peak 1 | Peak 2 | Peak 3 | Peak 4 |
|---|---|---|---|---|---|---|---|
| no | – | 15.9 | 2.5 | 604 | 551 | 716 | — |
| yes | – | 26.8 | 8.3 | 695 | 1224 | 696 | — |
| yes | + | 34.9 | 12.1 | 1559 | 2847 | 2854 | 1804 |

(The retention time for the hydrolysis products 1 to 4 is 9, 17, 24 and 29.5 min respectively)

Comparative Example 2

Nibs are prepared conventionally from cocoa beans from *Theobroma cacao* Trinitario ICS-95 which had been traditionally fermented for 1, 2, 3, 4, 5 and 7 days, and then dried. The degree of hydrolysis of the nib proteins is then analysed by determining, by means of the method described above, the areas of the elution peaks of four hydrolysis products in the fermented nibs (products associated with the natural fermentation of the beans). The results are presented in Table 2 below.

The analysis of the nib proteins by SDS-PAGE chromatography on a polyacrylamide gel shows an intense degradation of the 31 kD and 47 kD bands in the case of the beans fermented for at least 3 days. On the other hand, the 21 kD band is not degraded in the case of the beans fermented for 1 to 7 days.

The various nibs are roasted at 130° C. for 15 min in an oven. Sensory analysis of the flavor given by the nibs shows that a 3-day fermentation of the beans is sufficient to obtain an acceptable cocoa flavor.

EXAMPLE 1

Nibs are prepared conventionally from cocoa beans from *Theobroma cacao* Trinitario ICS-95 which have been traditionally fermented for 1, 2, 3, 4, 5 and 7 days, and then dried. 1 ml of 200 mM citrate buffer pH 4 is then mixed with 100 mg of each type of nib, the mixture is incubated for 2 h at 50° C., its pH is adjusted with 1 ml of a 200 mM citrate buffer pH 7, 40 μl of carboxypeptidase A (0.06 units/μl, Sigma) are added to it, it is incubated at 25° C. for 1 h and then the reaction is stopped by heating the mixture at 95° C. for 5 min. The degree of hydrolysis of the cocoa proteins is then analysed by determining, by means of the methods described above, the free amino acid content and the areas of the elution peaks of four predominant hydrolysis products of the nibs (products associated with the natural fermentation of the beans).

The results presented in Table 2 show that it is possible to increase at least 1.4-fold the hydrolysis product content in a nib obtained from underfermented or well fermented cocoa beans. Furthermore, the hydrophobic amino acid content of all the treated nibs and of the nibs fermented for 3 to 7 days is always greater than 10 $\mu$mol per gram of dry matter.

TABLE 2

| Days of fermen-tation | Enzymatic treatment | Areas for the hydrolysis products (arbitrary units) | | | | Increase in the hydro-lysis product |
|---|---|---|---|---|---|---|
| | | Peak 1 | Peak 2 | Peak 3 | Peak 4 | |
| 1 | No  | 565  | 1017 | 833  | —   | |
| 1 | Yes | 1181 | 2626 | 1191 | —   | × 2.06 |
| 2 | No  | 1072 | 2393 | 1190 | —   | |
| 2 | Yes | 1880 | 4044 | 1968 | —   | × 1.70 |
| 3 | No  | 1600 | 3643 | 1595 | 170 | |
| 3 | Yes | 2083 | 5074 | 2618 | 890 | × 1.52 |
| 4 | No  | 1583 | 3444 | 1794 | 202 | |
| 4 | Yes | 3107 | 6051 | 2836 | 596 | × 1.79 |
| 5 | No  | 1663 | 3383 | 1249 | 270 | |
| 5 | Yes | 2230 | 4719 | 2486 | —   | × 1.43 |
| 7 | No  | 2061 | 3971 | 1202 | 267 | |
| 7 | Yes | 2862 | 5555 | 2563 | —   | × 1.46 |

(The retention time for the hydrolysis products 1 to 4 is 9, 17, 24 and 29.5 min respectively)

EXAMPLE 2

Nibs are prepared conventionally from cocoa beans from *Theobroma cacao* Trinitario ICS-95 which have been traditionally fermented for 1, 2, 3, 4, 5 and 7 days, and then dried. 100 $\mu$l of 200 mM citrate buffer pH 4 are then mixed with 100 mg of each type of nib, the mixture is incubated for 2 h at 50° C., its pH is adjusted with 100 $\mu$l of a 200 mM citrate buffer pH 7, 40 $\mu$l of carboxypeptidase A (0.06 units/$\mu$l, Sigma) are added to it, it is incubated at 25° C. for 1 h and then the reaction is stopped by heating the mixture at 95° C. for 5 min. The degree of hydrolysis of the cocoa proteins is then analysed by determining, by means of the methods described above, the free amino acid content and the areas of the elution peaks of four predominant hydrolysis products of the nibs (products associated with the natural fermentation of the beans). The results are similar to those obtained in Example 1.

EXAMPLE 3

A liquor is prepared from insufficiently fermented cocoa beans obtained from various genotypes of *Theobroma cacao*. The proteins of these beans exhibit, in SDS-PAGE chromatography on a polyacrylamide gel, 3 visible bands of proteins corresponding to the 21 kD and 31 kD/47 kD storage proteins.

The hydrolysis product content of a portion of the liquor are determined by means of the methods described above. 1 ml of 200 mM citrate buffer pH 4 is then mixed with 100 mg of a portion of the liquor, the mixture is incubated for 2 h at 50° C., its pH is adjusted with 1 ml of a 200 mM citrate buffer pH 7, 40 $\mu$l of carboxypeptidase A (0.06 units/$\mu$l, Sigma) are added to it, it is incubated at 25° C. for 1 h and then the reaction is stopped by heating the mixture at 95° C. for 5 min. The degree of hydrolysis of the proteins is finally analysed by determining the hydrolysis product content of the liquor (methods above).

The results presented in Table 3 below show that the treatment according to the invention makes it possible to significantly increase the content of flavor precursors in a liquor obtained from a mixture of underfermented beans.

TABLE 3

| Enzymatic treatment | Amino acids ($\mu$mol/g dry weight) | | Areas for the hydrolysis products (arbitrary units) | | | |
|---|---|---|---|---|---|---|
| | Total | Hydrophobic | Peak 1 | Peak 2 | Peak 3 | Peak 4 |
| no  | 22.2 | 7.7  | —   | 1451 | 613  | —   |
| yes | 35.9 | 14.7 | 771 | 2359 | 1115 | 724 |

(The retention time for the hydrolysis products 1 to 4 is 9, 17, 24 and 29.5 min respectively)

EXAMPLE 4

500 g of insufficiently fermented cocoa beans obtained from various genotypes of *Theobroma cacao* are treated enzymatically in a manner identical to that described in Example 3. The pH of the inactivated mixture is then adjusted to 5–6, 0.3% glucose and 0.6% fructose are added, the mixture is dried by evaporation of water under vacuum during gentle heating (60° C.) until the moisture content is less than 5%, it is roasted in an oven at 130° C. for 15 min, and the flavor given off by the roasted mixture is analysed by the sensory test described above. The results show that the nibs from underfermented beans, treated according to the invention and roasted, have an intense flavor characteristic of a cocoa flavor derived from well fermented and roasted beans.

EXAMPLE 5

A liquor is prepared conventionally from overented cocoa beans obtained from various genotypes of *Theobroma cacao*. The proteins of these beans do not exhibit, in SDS-PAGE chromatography on a polyacrylamide gel, any visible bands of proteins corresponding to the 21 kD and 31 kD/47 kD storage proteins.

The hydrolysis product content of a portion of the liquor is determined by means of the methods described above. 1 ml of 200 mM citrate buffer pH 4 is then mixed with 100 mg of a portion of the liquor, the mixture is incubated for 2 h at 50° C., its pH is adjusted with 1 ml of a 200 mM citrate buffer pH 7, 40 $\mu$l of carboxypeptidase A (0.06 units/$\mu$l, Sigma) are added to it, it is incubated at 25° C. for 1 h and then the reaction is stopped by heating the mixture at 95° C. for 5 min. The degree of hydrolysis of the proteins is finally analysed by determining the hydrolysis product content of the liquor (methods above).

The results presented in Table 4 below show that the treatment according to the invention makes it possible to significantly increase the content of flavor precursors in a liquor obtained from a mixture of overfermented beans.

TABLE 4

| Enzymatic treatment | Amino acids ($\mu$mol/g dry weight) | | Areas for the hydrolysis products (arbitrary units) | | | |
|---|---|---|---|---|---|---|
| | Total | Hydrophobic | Peak 1 | Peak 2 | Peak 3 | Peak 4 |
| no  | 49.5 | 19.2 | 960  | 2192 | 727  | — |
| yes | 59.6 | 25.8 | 2102 | 4508 | 3026 | — |

(The retention time for the hydrolysis products 1 to 4 is 9, 17, 24 and 29.5 min respectively)

EXAMPLE 6

500 g of overfermented cocoa beans obtained from various genotypes of *Theobroma cacao* are treated enzymatically in a manner identical to that described in Example 5. The pH of the inactivated mixture is then adjusted to 5–6, 0.3% glucose and 0.6% fructose are added, the mixture is dried by evaporation of water under vacuum during gentle heating (60° C.) until the moisture content is less than 5%, it is roasted in an oven at 130° C. for 15 min, and the flavor given off by the roasted mixture is analysed by the sensory test described above. The results show that the nibs from overfermented beans, treated according to the invention and roasted, have an intense flavor characteristic of a cocoa flavor derived from well fermented and roasted beans.

EXAMPLE 7

Several nibs are prepared from cocoa beans fermented traditionally for 1 day, 140 mg of each nib are mixed with 100 µl of an aqueous solution of Maxinvert L10000 invertase (Gist Brocades) comprising various activity units, the mixtures are incubated for 30 min or 120 min, the reaction is stopped by heating at 95° C. for 1 min, and the glucose content of each mixture is determined by means of the method described above. The results presented in FIG. 1 show that 1 unit/ml of invertase is sufficient to hydrolyse more than 80% of the sucrose to glucose and fructose.

EXAMPLE 8

A liquor from underfermented Sanchez cocoa beans (175 g) is incubated for 2 h at 50° C. in 350 ml of water whose pH is adjusted to pH 4.5 with a solution of acetic acid (activation of the endoproteases), then the pH is adjusted to 7 with a solution of potassium carbonate and the mixture is incubated for 15 min at 50° C. with the Maxinvert L10000 invertase (20 units/g) and carboxypeptidase A (0.06 units/ml), or the mixture is incubated for 15 min at 50° C. with 20 units/g of Maxinvert L10000 invertase and 1% Corolase PP protease (Roehm, DE) or for 60 min at 50° C. with 20 units/g of Maxinvert L10000 invertase and 1% Promod 192P protease (Biocatalyst, UK) or 1% Promod 279P protease (Biocatalyst). The reaction is stopped by heating the mixture at 95° C. for 5 min. The degree of hydrolysis of the proteins is finally analysed by determining the hydrolysis product content of the liquor (methods above).

After the reaction, the pH of the mixture is adjusted to 5.2, the mixture is dried, it is roasted and it is subjected to the sensory analysis described above.

The results presented in Table 5 below show that flavor precursors are formed by using the protease and invertase preparations.

TABLE 5

| Enzymes | Amino acids (µmol/g dry weight) | | % hydrophobic amino acid | Hydrolysis products (area: arbitrary unit) | | | Glucose formed (mg/g) |
|---|---|---|---|---|---|---|---|
| | Total | Hydrophobic | (Phe, Leu, Ala) | Peak 1 | Peak 2 | Peak 3 | |
| No treatment | 36.6 | 10.6 | 29.0 | 412 | 651 | 377 | 0.0 |
| Promod 192P | 49.8 | 15.4 | 30.9 | 607 | 1012 | 494 | 5.2 |
| Promod 279P | 53.4 | 16.3 | 30.5 | 575 | 958 | 470 | 5.6 |
| Corolase PP | 44.3 | 15.6 | 35.2 | 1053 | 1423 | 1088 | 1.7 |
| Carboxypeptidase | 37.6 | 12.9 | 34.3 | 759 | 1194 | 646 | 2.3 |

TABLE 5-continued (The retention time for the hydrolysis product 1 to 3 is 9, 17 and 24 min respectively)

EXAMPLE 9

Results similar to those obtained in Example 8 are obtained if, under the same conditions, insufficiently fermented Indonesian Sulawesi cocoa beans are treated with a protease and if the invertase is replaced by an addition of 0.6% fructose and 0.3% of glucose during the enzymatic treatment.

EXAMPLE 10

In a manner similar to Example 8, a liquor from underfermented Sanchez cocoa beans is incubated with 20 units/g of invertase and with various concentrations of the Promod 192P protease while allowing the endoprotease and the Promod 192 protease to act at the same time or consecutively at pH 4.5. The reaction is stopped by heating the mixture at 95° C., for 5 min (except for test 5). The degree of hydrolysis of the proteins is analysed by determining the hydrolysis product content of the liquor (methods above). The pH of the mixture is adjusted to 5.2, the mixture is dried, it is roasted and it is subjected to the sensory analysis described above.

The reaction conditions are presented in Table 6 below. The results presented in Table 7 below show (1) that the enzyme concentration can be reduced, (2) that all the reactions can be performed in a single step, (3) that it is possible to avoid inactivating the mixture before drying, and (4) that the water content can be reduced during the incubation.

TABLE 6

| Tests | Enzyme Promod 192P | Endoprotease pH 4.5 | Promod 192P pH 4.5 | Invertase pH 4.5 | Cocoa Liquor (g) | Added water (ml) | Heating before drying | Final pH |
|---|---|---|---|---|---|---|---|---|
| 1 | Control: no treatment | | | | | | | |
| 2 | 1.0% | 2 h | 1 h | 20 U/g | 175 | 350 | yes | 5.2 |
| 3 | 1.0% | 3 h, at the same time | | 20 U/g | 175 | 350 | yes | 5.2 |
| 4 | 0.2% | 3 h, at the same time | | 20 U/g | 175 | 350 | yes | 5.2 |
| 5 | 1.0% | 2 h | 1 h | 20 U/g | 175 | 350 | no | 5.2 |
| 6 | 1.0% | 2 h | 1 h | 20 U/g | 175 | 175 | yes | 5.2 |

TABLE 7

| Tests | Amino acids ($\mu$mol/g dry) Total | Amino acids ($\mu$mol/g dry) Hydrophobic | % hydrophobic amino acid (Phe, Leu, Ala) | Hydrolysis products (area: arbitrary unit) Peak 1 | Hydrolysis products (area: arbitrary unit) Peak 2 | Hydrolysis products (area: arbitrary unit) Peak 3 | Glucose formed (mg/g) |
|---|---|---|---|---|---|---|---|
| 1 | 36.0 | 10.6 | 28.9 | 412 | 651 | 377 | 0.0 |
| 2 | 60.9 | 18.5 | 30.4 | 736 | 1277 | 560 | 4.6 |
| 3 | 69.3 | 20.7 | 29.8 | 1025 | 1692 | 751 | 4.3 |
| 4 | 46.2 | 14.0 | 30.4 | 547 | 942 | 427 | 5.0 |
| 5 | 104.6 | 31.6 | 30.2 | 1322 | 2241 | 1167 | 5.4 |
| 6 | 65.3 | 20.6 | 31.5 | 798 | 1444 | 606 | 3.8 |

(The retention time for the hydrolysis products 1 to 3 is 9, 17 at 24 min respectively)

After the reaction, the pH of the mixtures is adjusted to 5.2, they are dried, they are roasted and they are subjected to the sensory analysis described above. The results show that the bad flavors specific to insufficiently fermented cocoa beans have disappeared. Furthermore, the cocoa flavor developed in the treated mixtures is similar to that desired. In particular, the samples from test 5 (reduced water content) are particularly preferred.

We claim:

1. Process for overcoming variability in the flavor precursor composition of mixtures of fermented cocoa beans, which comprises:
   preparing a nib or a liquor from a mixture of (1) cocoa beans of different origins; or (2) cocoa beans subjected to different stages of fermentation of 1 to 15 days;
   mixing the nib or liquor with at least one technical protease in an aqueous medium at a pH of 3–8;
   incubating the protease-containing mixture for a time and at a temperature sufficient to hydrolyse the proteins and the peptides present therein; and
   roasting the incubated mixture to obtain a composition having a flavor characteristic of well-fermented and roasted cocoa beans.

2. The process according to claim 1, wherein the incubation step is carried out for a time and at a temperature sufficient to obtain at least 10 $\mu$mol of hydrophobic amino acids per gram of dry matter and at least 1.4 times more hydrolysis products, compared with those initially present in the cocoa beans.

3. The process according to claim 1, wherein the aqueous medium has a pH of 4–8, and the incubating step is carried out at 10°–60° C. for 5 minutes to 20 hours.

4. The process according to claim 1, wherein the mixture of beans includes beans from more than one genotype of cocoa trees.

5. The process according to claim 1, wherein the mixture of the nib or liquor with at least one technical protease comprises 10–80% by weight of the cocoa bean nib or liquor and 1–100 units of technical protease per gram of the mixture.

6. The process according to claim 1, which further comprises adding at least one technical enzyme chosen from the group consisting of invertases, glycosidases, cellulases, pectinases and oxydases to the mixture of the nib or liquor with at least one technical protease prior to the incubating step.

7. The process according to claim 1, which further comprises adding at least 0.1% by weight of a reducing sugar to the nib or liquor prior to roasting.

8. The process of claim 1, which further comprises drying the incubated mixture prior to roasting.

9. A process for overcoming variability in the flavor precursor composition of mixtures of fermented cocoa beans, which comprises:
   preparing a nib or a liquor from a mixture of (1) cocoa beans of different origins; or (2) cocoa beans subjected to different stages of fermentation of 1 to 15 days;
   mixing the nib or liquor with an aqueous medium at a pH of 3–6;
   incubating the aqueous mixture at a temperature of 40°–60° C. for a time of 10 minutes to 20 hours;
   adjusting the pH of the incubated mixture to 4–8;
   adding at least one technical protease to the incubated mixture;
   incubating the protease containing mixture for a time and at a temperature sufficient to hydrolyse the proteins and the peptides present therein; and
   roasting the incubated protease containing mixture to obtain a composition having a flavor characteristic of well-fermented and roasted cocoa beans.

10. The process of claim 9, wherein the mixture of beans includes beans from more than one genotype of cocoa trees.

11. The process of claim 9, wherein the second incubation step is carried out for a time of 5 minutes to 20 hours and at a temperature of 10°–60° C.

12. The process of claim 9, wherein the mixture containing at least one technical protease comprises 10–80% by weight of the cocoa bean nib or liquor and 1–100 units of technical protease per gram of the mixture.

13. The process of claim 9, which further comprises adding at least one technical enzyme selected from the group consisting of invertases, glycosidases, cellulases, pectinases and oxydases to the mixture so that the technical enzyme is present in the mixture during at least one of the two incubating steps.

14. The process of claim 9, which further comprises adding at least 0.1% by weight of a reducing sugar to the nib or liquor prior to roasting.

15. The process of claim 9, which further comprises drying the incubated protease containing mixture prior to roasting.

* * * * *

UNITED STATES PATENT AND TRADEMARK OFFICE
CERTIFICATE OF CORRECTION

PATENT NO. : 5,888,562

DATED : March 30, 1999

INVENTORS : Carl Erik Hansen et al.

It is certified that error appears in the above-identified patent and that said Letters Patent is hereby corrected as shown below:

On the title page: Item
[22]: change the filing date from "Jun. 10, 1996" to --Jun. 7, 1996--.

Signed and Sealed this

Fourteenth Day of September, 1999

Attest:

Q. TODD DICKINSON

*Attesting Officer*    *Acting Commissioner of Patents and Trademarks*